United States Patent
Fainstain et al.

(10) Patent No.: US 9,106,813 B2
(45) Date of Patent: Aug. 11, 2015

(54) NOISE SUPPRESSION DEVICES AND IMAGE CAPTURING APPARATUSES HAVING THE SAME

(71) Applicant: Samsung Electronics Co., Ltd., Suwon-Si, Gyeonggi-Do (KR)

(72) Inventors: Eugene Fainstain, Netanya (IL); Evgeny Artyomov, Rehovot (IL)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 87 days.

(21) Appl. No.: 13/778,914

(22) Filed: Feb. 27, 2013

(65) Prior Publication Data

US 2014/0240555 A1    Aug. 28, 2014

(51) Int. Cl.
*H04N 5/217* (2011.01)
*H04N 5/21* (2006.01)
*G06T 5/00* (2006.01)

(52) U.S. Cl.
CPC ............ *H04N 5/217* (2013.01); *G06T 5/002* (2013.01); *H04N 5/21* (2013.01)

(58) Field of Classification Search
CPC .......... H04N 5/217; H04N 9/77; H04N 9/646
USPC .................................. 348/241; 382/264, 167
See application file for complete search history.

(56) References Cited

U.S. PATENT DOCUMENTS

| | | | |
|---|---|---|---|
| 2003/0160899 A1* | 8/2003 | Ngai et al. | 348/607 |
| 2008/0239154 A1 | 10/2008 | Yamauchi | |
| 2009/0052798 A1* | 2/2009 | Kwon et al. | 382/264 |
| 2009/0161019 A1 | 6/2009 | Jang | |
| 2009/0207911 A1* | 8/2009 | Minamoto | 375/240.03 |

FOREIGN PATENT DOCUMENTS

| | | |
|---|---|---|
| JP | 2008252592 A | 10/2008 |
| JP | 2010020523 A | 1/2010 |
| KR | 2009067911 A | 6/2013 |

* cited by examiner

*Primary Examiner* — Antoinette Spinks
(74) *Attorney, Agent, or Firm* — Harness, Dickey & Pierce, P.L.C.

(57) ABSTRACT

A noise elimination device includes a low pass filter unit, a noise filtering unit and a signal synthesis unit. The low pass filter unit generates a low frequency image signal by separating low frequency elements from an input image signal. The noise filtering unit generates a filtered image signal by suppressing noise in the low frequency image signal in horizontal and vertical directions. The signal synthesis unit generates an output image signal by combining the high frequency image signal and the filtered image signal.

20 Claims, 5 Drawing Sheets

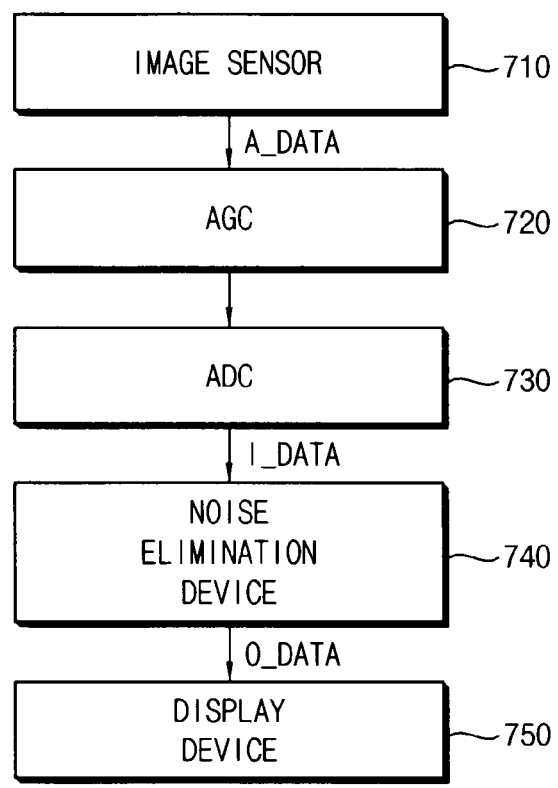

NOISE SUPPRESSION DEVICES AND IMAGE CAPTURING APPARATUSES HAVING THE SAME

BACKGROUND

1. Technical Field

Example embodiments relate to image processing technology, and more particularly to noise suppression devices and image capturing apparatuses including noise suppression devices.

2. Description of the Related Art

Generally, an image signal captured by a digital camera includes noise, herein referred to as noise elements. If the noise elements are not suppressed and/or eliminated before the image signal is displayed by a display apparatus, display quality will be degraded. In one example, if low frequency noise elements are not suppressed from the image signal prior to display, then low frequency luminance spots will be shown in the display.

As resolution of display apparatuses increases, noise suppression devices effectively suppressing and/or eliminating noise elements included in the image signal becomes more important.

SUMMARY

At least some example embodiments provide noise suppression and/or elimination devices that effectively suppress and/or eliminate low frequency noise elements.

At least some other example embodiments provide image capturing apparatuses including noise suppression and/or elimination devices.

According to at least one example embodiment, a noise elimination device includes: a low pass filter unit, a high frequency separation unit, a noise filtering unit and a signal synthesis unit. The low pass filter unit is configured to generate a low frequency image signal by separating low frequency elements from an input image signal. The high frequency separation unit is configured to generate a high frequency image signal by separating high frequency elements from the input image signal using the low frequency image signal. The noise filtering unit is configured to generate a filtered image signal by performing noise elimination on the low frequency image signal in both a horizontal direction and a vertical direction. The signal synthesis unit is configured to generates an output image signal by combining the high frequency image signal and the filtered image signal.

In at least some example embodiments, the noise filtering unit may include: a decimation unit configured to generate a compressed image signal by decimating the low frequency image signal in the horizontal direction; a horizontal filtering unit configured to generate a first filtered image signal by performing noise elimination on the compressed image signal in the horizontal direction; a vertical filtering unit configured to generate a second filtered image signal by performing noise elimination on the first filtered image signal in the vertical direction; and an interpolation unit configured to generate the filtered image signal by interpolating the second filtered image signal in the horizontal direction.

The horizontal filtering unit may generate the first filtered image signal by averaging pixel values of adjacent pixels in the horizontal direction in the compressed image signal.

The vertical filtering unit may generate the second filtered image signal by averaging pixel values of adjacent pixels in the vertical direction in the first filtered image signal.

The vertical filtering unit may include an asymmetric infinite impulse response filter.

The noise filtering unit may further include a signal processing unit coupled between the horizontal filtering unit and the vertical filtering unit. The signal processing unit may be configured to correct the first filtered image signal based on the compressed image signal, and provide the corrected first filtered image signal to the vertical filtering unit.

The first signal processing unit may be configured to correct the first filtered image signal by replacing pixel values representing image elements in the first filtered image signal with pixel values representing image elements in the compressed image signal.

The noise filtering unit may further include a signal processing unit coupled between the vertical filtering unit and the interpolation unit. The signal processing unit may be configured to correct the second filtered image signal based on the compressed image signal, and provide the corrected second filtered image signal to the interpolation unit.

The second signal processing unit may correct the second filtered image signal by replacing pixel values representing image elements in the second filtered image signal with pixel values representing image elements in the compressed image signal.

According to at least some example embodiments, the high frequency separation unit may include a subtracter configured to generate the high frequency image signal by subtracting the low frequency image signal from the input image signal.

The signal synthesis unit may include an adder configured to generate the output image signal by adding the high frequency image signal and the filtered image signal.

The noise elimination device may further include: an RGB-YUV conversion unit configured to generate the input image signal by converting a format of an image signal having an RGB format into a YUV format; and a YUV-RGB conversion unit configured to generate an RGB output image signal by converting a format of the output image signal having a YUV format into an RGB format.

At least one other example embodiment provides an image capturing apparatus. According to at least this example embodiment, an image capturing apparatus includes: an image sensor; an analog-digital converter; and a noise elimination device. The image sensor is configured to detect incident light to generate an analog signal corresponding to the detected incident light. The analog-digital converter is configured to digitize the analog signal to generate input image data. The noise elimination device is configured to eliminate low frequency noise elements from the input image signal to generate an output image signal. The noise elimination device includes: a low pass filter unit configured to generate a low frequency image signal by separating low frequency elements from the input image signal; a high frequency separation unit configured to generate a high frequency image signal by separating high frequency elements from the input image signal using the low frequency image signal; a noise filtering unit configured to generate a filtered image signal by performing noise elimination on the low frequency image signal in both a horizontal direction and a vertical direction; and a signal synthesis unit configured to generate the output image signal by combining the high frequency image signal and the filtered image signal.

According to at least some example embodiments, the noise filtering unit may include: a decimation unit configured to generate a compressed image signal by decimating the low frequency image signal in the horizontal direction; a horizontal filtering unit configured to generate a first filtered image signal by performing noise elimination on the compressed image signal in the horizontal direction; a vertical filtering unit configured to generate a second filtered image signal by performing noise elimination on the first filtered image signal in the vertical direction; and an interpolation unit configured to generate the filtered image signal by interpolating the second filtered image signal in the horizontal direction.

The noise filtering unit may further include: a first signal processing unit coupled between the horizontal filtering unit and the vertical filtering unit; and a second signal processing unit coupled between the vertical filtering unit and the interpolation unit. The first signal processing unit may be configured to correct the first filtered image signal based on the compressed image signal, and provide the corrected first filtered image signal to the vertical filtering unit. The second signal processing unit may be configured to correct the second filtered image signal based on the compressed image signal, and provide the corrected second filtered image signal to the interpolation unit.

At least one other example embodiment provides a noise suppression device. According to at least this example embodiment, the noise suppression device includes: a low pass filter unit configured to generate a low frequency image signal by separating low frequency elements from an input image signal; a noise filtering unit configured to generate a filtered image signal by separately suppressing noise in the low frequency image signal in both horizontal and vertical directions; and a signal synthesis unit configured to generate an output image signal based on the filtered image signal.

According to at least some example embodiments, the noise suppression device may further include: a high frequency separation unit configured to generate a high frequency image signal by separating high frequency elements from the input image signal using the low frequency image signal; wherein the signal synthesis unit is configured to generate the output image signal by combining the high frequency image signal with the filtered image signal.

The noise filtering unit may further include: a decimation unit configured to generate a compressed image signal by decimating the low frequency image signal in the horizontal direction; a horizontal filtering unit configured to generate a first filtered image signal by suppressing noise from the compressed image signal in the horizontal direction; a vertical filtering unit configured to generate a second filtered image signal by suppressing noise from the first filtered image signal in the vertical direction; and an interpolation unit configured to generate the filtered image signal by interpolating the second filtered image signal in the horizontal direction. The horizontal filtering unit may be configured to generate the first filtered image signal by averaging pixel values of adjacent pixels in the horizontal direction. The vertical filtering unit may be configured to generate the second filtered image signal by averaging pixel values of adjacent pixels in the vertical direction.

According to at least one other example embodiment, an image capturing apparatus includes: an image sensor; an analog-digital converter; and a noise suppression device. The image sensor is configured to detect incident light to generate an analog signal corresponding to the detected incident light. The analog-digital converter is configured to digitize the analog signal to generate input image data. The noise suppression device is configured to suppress low frequency noise elements from the input image signal to generate an output image signal. The noise suppression device includes: a low pass filter unit configured to generate a low frequency image signal by separating low frequency elements from an input image signal; a noise filtering unit configured to generate a filtered image signal by separately suppressing noise in the low frequency image signal in both horizontal and vertical directions; and a signal synthesis unit configured to generate an output image signal based on the filtered image signal.

The noise filtering unit may be configured to sequentially suppress noise from the low frequency image signal in a first of the horizontal and vertical directions, and then in a second of the horizontal and vertical directions.

BRIEF DESCRIPTION OF THE DRAWINGS

Illustrative, non-limiting example embodiments will be more clearly understood from the following detailed description in conjunction with the accompanying drawings.

FIG. 5 is a block diagram illustrating an image capturing apparatus according to example embodiments.

DETAILED DESCRIPTION OF THE EMBODIMENTS

Figure 1:
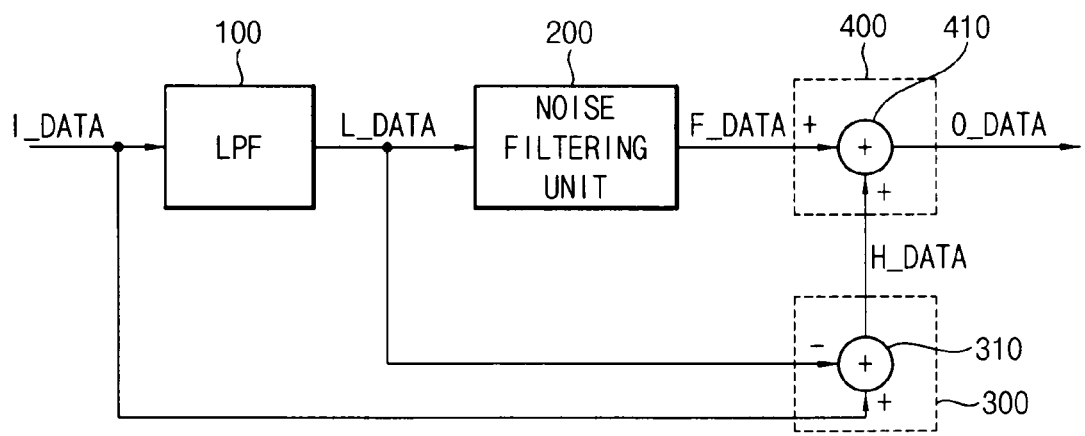
FIG. 1 is a block diagram illustrating a noise suppression and/or elimination device according to example embodiments.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

FIG. 1 is a block diagram illustrating a noise suppression and/or elimination device according to example embodiments.

Referring to FIG. 1, a noise suppression and/or elimination device 10a includes: a low pass filter unit LPF 100, a noise filtering unit 200, a high frequency separation unit 300 and a signal synthesis unit 400. Although discussed herein as units, it should be understood that these components, as well as components similar thereto, may be regarded as circuits implemented by suitable structure. Moreover, one or more of these components may be implemented by hardware including, for example, one or more Central Processing Units (CPUs), digital signal processors (DSPs), application-specific-integrated-circuits, field programmable gate arrays (FPGAs) computers or the like.

The low pass filter unit 100 receives an input image signal I_DATA. The input image signal I_DATA may have a YUV format including a luminance signal Y and chrominance signals Cb and Cr. The low pass filter unit 100 generates a low frequency image signal L_DATA by separating low frequency elements from the input image signal I_DATA. The low frequency image signal L_DATA may include both image elements representing a captured image and noise elements.

The noise filtering unit 200 generates a filtered image signal F_DATA by performing noise suppression and/or elimination on the low frequency image signal L_DATA in both a horizontal direction and a vertical direction. The noise filtering unit 200 may suppress (e.g., effectively eliminate) noise elements included in the low frequency image signal L_DATA since the noise filtering unit 200 separately suppresses and/or eliminates noise elements in the horizontal direction and the vertical direction. A detailed operation of the noise filtering unit 200 will be described below with reference to FIGS. 2 and 3.

The high frequency separation unit 300 generates a high frequency image signal H_DATA by separating high frequency elements from the input image signal I_DATA using the low frequency image signal L_DATA. In some example embodiments, the high frequency separation unit 300 may include a subtracter 310. The subtracter 310 may generate the high frequency image signal H_DATA by subtracting the low frequency image signal L_DATA from the input image signal I_DATA.

The signal synthesis unit 400 generates an output image signal O_DATA by combining the high frequency image signal H_DATA and the filtered image signal F_DATA. In some example embodiments, the signal synthesis unit 400 may include an adder 410. The adder 410 may generate the output image signal O_DATA by adding the high frequency image signal H_DATA and the filtered image signal F_DATA.

Figure 2:
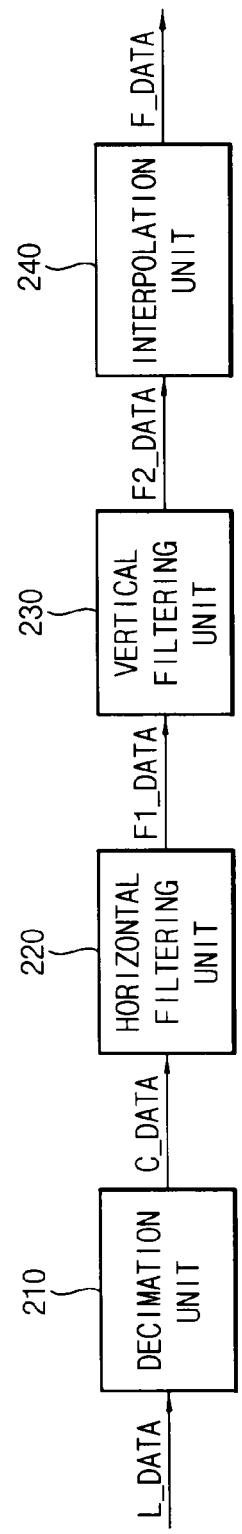
FIG. 2 is a block diagram illustrating an example embodiment of a noise filtering unit included in the noise suppression and/or elimination device of FIG. 1.

FIG. 2 is a block diagram illustrating an example embodiment of a noise filtering unit included in the noise suppression and/or elimination device of FIG. 1.

Referring to FIG. 2, a noise filtering unit 200a may include a decimation unit 210, a horizontal filtering unit 220, a vertical filtering unit 230 and an interpolation unit 240.

The decimation unit 210 receives the low frequency image signal L_DATA from the low pass filter unit 100, and generates a compressed image signal C_DATA by decimating the low frequency image signal L_DATA in the horizontal direction. For example, the decimation unit 210 may decrease a data size of the low frequency image signal L_DATA by sampling the low frequency image signal L_DATA in the horizontal direction to generate the compressed image signal C_DATA. Since the decimation unit 210 decreases a data size of the low frequency image signal L_DATA, operation speeds of the horizontal filtering unit 220 and the vertical filtering unit 230 may increase.

The horizontal filtering unit 220 may generate a first filtered image signal F1_DATA by performing noise suppression and/or elimination on the compressed image signal C_DATA in the horizontal direction. In some example embodiments, the horizontal filtering unit 220 may average pixel values of adjacent pixels in the horizontal direction in the compressed image signal C_DATA to generate the first filtered image signal F1_DATA. However, according to example embodiments, the horizontal filtering unit 220 may use various filtering methods.

The vertical filtering unit 230 may generate a second filtered image signal F2_DATA by performing noise suppression and/or elimination on the first filtered image signal F1_DATA in the vertical direction. In some example embodiments, the vertical filtering unit 230 may be an asymmetric infinite impulse response filter. In other example embodiments, the vertical filtering unit 230 may average pixel values of adjacent pixels in the vertical direction in the first filtered image signal F1_DATA to generate the second filtered image signal F2_DATA. However, according to example embodiments, the vertical filtering unit 230 may use various filtering methods.

As shown in FIG. 2, the noise filtering unit 200a is configured to sequentially suppress noise from the low frequency image signal in the horizontal direction, and then in the vertical direction. However, example embodiments are not limited to this example. The noise filtering unit 200a may be configured to sequentially suppress noise from the low frequency image signal in the vertical direction, and then in the horizontal direction.

In at least one example embodiment, the interpolation unit 240 generates the filtered image signal F_DATA by interpolating the second filtered image signal F2_DATA in the horizontal direction. An interpolation rate of the interpolation unit 240 may be the same or substantially the same as a decimation rate of the decimation unit 210. According to example embodiments, the interpolation unit 240 may use various interpolation methods such as a linear interpolation, an exponential interpolation, a polynomial interpolation, etc. to generate the filtered image signal F_DATA.

According to at least some example embodiments, the location of the horizontal filtering unit 220 and the vertical filtering unit 230 may be switched such that noise suppression and/or elimination in the vertical direction is performed prior to noise suppression and/or elimination in the horizontal direction.

Figure 3:
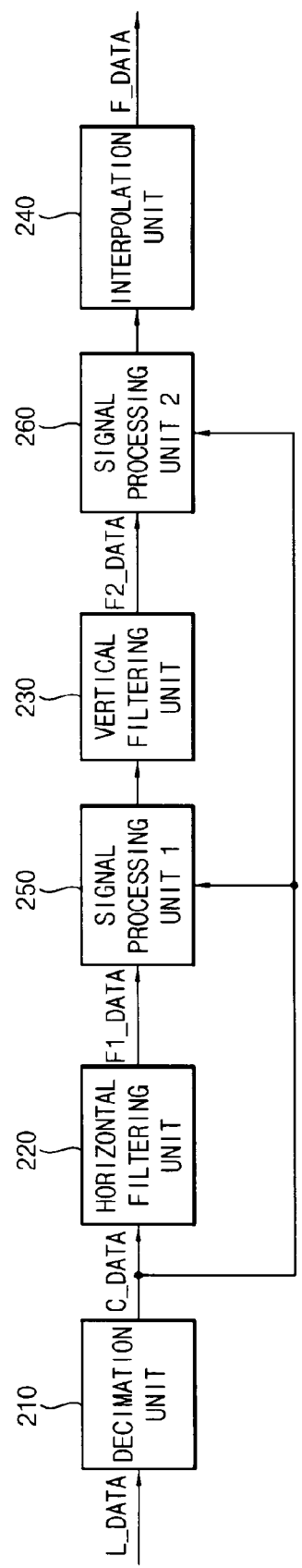
FIG. 3 is a block diagram illustrating another example embodiment of a noise filtering unit included in the noise suppression and/or elimination device of FIG. 1.

FIG. 3 is a block diagram illustrating another example embodiment of a noise filtering unit included in the noise suppression and/or elimination device of FIG. 1.

Referring to FIG. 3, a noise filtering unit 200b includes: a decimation unit 210; a horizontal filtering unit 220; a vertical filtering unit 230; an interpolation unit 240; a first signal processing unit 250; and a second signal processing unit 260.

The noise filtering unit 200b of FIG. 3 is similar to the noise filtering unit 200a of FIG. 2, except that the noise filtering unit 200b further includes a first signal processing unit 250 and a second signal processing unit 260. Operation of the decimation unit 210, the horizontal filtering unit 220, the vertical filtering unit 230 and the interpolation unit 240 are the same or substantially the same as described above with reference to FIG. 2. Therefore, a detail description of the decimation unit 210, the horizontal filtering unit 220, the vertical filtering unit 230 and the interpolation unit 240 will be omitted here.

The first signal processing unit 250 is coupled between the horizontal filtering unit 220 and the vertical filtering unit 230. The compressed image signal C_DATA includes image elements representing a captured image and noise elements. After the horizontal filtering unit 220 performs noise suppression and/or elimination on the compressed image signal C_DATA in the horizontal direction, pixel values representing image elements as well as pixel values representing noise elements may be distorted. The first signal processing unit 250 corrects the first filtered image signal F1_DATA based on the compressed image signal C_DATA, and provides the corrected first filtered image signal to the vertical filtering unit 230. In one example, the first signal processing unit 250 replaces pixel values representing image elements in the first filtered image signal F1_DATA with pixel values representing image elements in the compressed image signal C_DATA to correct the first filtered image signal F1_DATA.

The second signal processing unit 260 is coupled between the vertical filtering unit 230 and the interpolation unit 240. The first filtered image signal F1_DATA includes both image elements representing a captured image and noise elements. After the vertical filtering unit 230 performs noise suppression and/or elimination on the first filtered image signal F1_DATA in the vertical direction, pixel values representing image elements as well as pixel values representing noise elements may be distorted. The second signal processing unit 260 corrects the second filtered image signal F2_DATA based on the compressed image signal C_DATA, and provides the corrected second filtered image signal to the interpolation unit 240. In one example, the second signal processing unit 260 replaces pixel values representing image elements in the second filtered image signal F2_DATA with pixel values representing image elements in the compressed image signal C_DATA to correct the second filtered image signal F2_DATA.

As with the example embodiment shown in FIG. 2, the noise filtering unit 200b shown in FIG. 3 is configured to sequentially suppress noise from the low frequency image signal in the horizontal direction, and then in the vertical direction. However, example embodiments are not limited to this example. The noise filtering unit 200b may be configured to sequentially suppress noise from the low frequency image signal in the vertical direction, and then in the horizontal direction.

As described above with reference to FIGS. 1, 2 and 3, the noise suppression and/or elimination device 10a of FIG. 1 divides the input image signal I_DATA into the low frequency image signal L_DATA and the high frequency image signal H_DATA, generate the filtered image signal F_DATA by suppressing and/or eliminating noise elements included in the low frequency image signal L_DATA using the noise filtering unit 200, and generate the output image signal O_DATA by combining the high frequency image signal H_DATA and the filtered image signal F_DATA. Therefore, the noise suppression and/or elimination device 10a may effectively suppress and/or eliminate low frequency noise elements included in the input image signal I_DATA without distorting high frequency elements of the input image signal I_DATA.

In addition, the noise filtering unit 200a and 200b may separately suppress and/or eliminate noise elements from the input image signal I_DATA in the horizontal direction and the vertical direction. Therefore, the noise filtering unit 200a and 200b may effectively suppress and/or eliminate low frequency noise elements included in the input image signal I_DATA.

Furthermore, since the noise filtering unit 200b includes the first signal processing unit 250 and/or the second signal processing unit 260, the noise filtering unit 200b may effectively suppress and/or eliminate low frequency noise elements included in the input image signal I_DATA without distorting a captured image.

Figure 4:
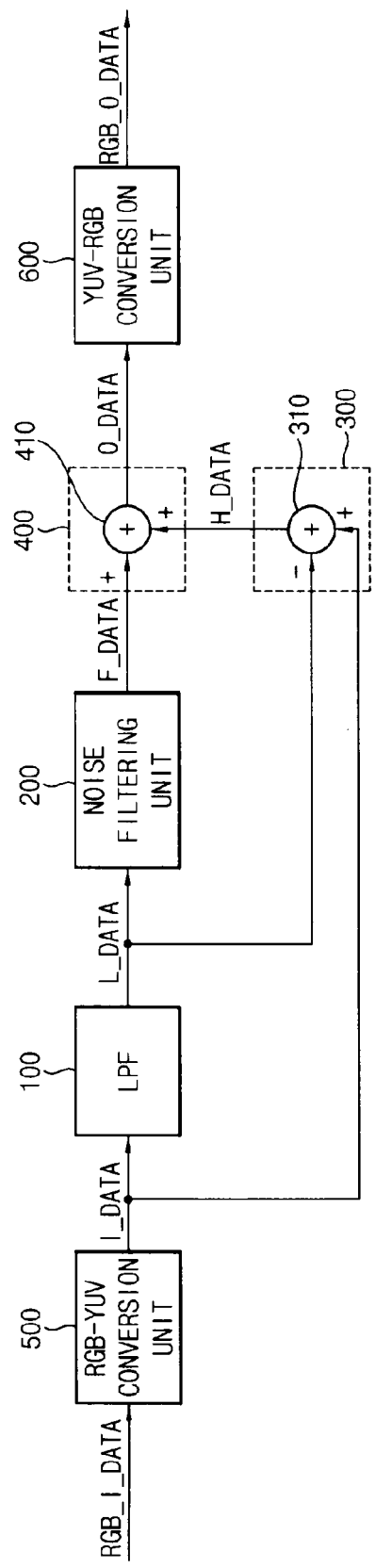
FIG. 4 is a block diagram illustrating a noise suppression and/or elimination device according to other example embodiments.

FIG. 4 is a block diagram illustrating a noise suppression and/or elimination device according to other example embodiments.

Referring to FIG. 4, a noise suppression and/or elimination device 10b includes: a low pass filter unit LPF 100; a noise filtering unit 200; a high frequency separation unit 300; a signal synthesis unit 400; an RGB-YUV conversion unit 500; and a YUV-RGB conversion unit 600.

The noise suppression and/or elimination device 10b of FIG. 4 is similar to the noise suppression and/or elimination device 10a of FIG. 1 except that the noise suppression and/or elimination device 10b further includes a RGB-YUV conversion unit 500 and a YUV-RGB conversion unit 600. A structure and operation of the noise suppression and/or elimination device 10a of FIG. 1 are described above with reference to FIGS. 1, 2 and 3. Therefore, a detail description of the low pass filter unit 100, the noise filtering unit 200, the high frequency separation unit 300 and the signal synthesis unit 400 will be omitted here.

If an image signal RGB_I_DATA input to the noise suppression and/or elimination device 10b has an RGB format including a red pixel data, a green pixel data and a blue pixel data, then the RGB-YUV conversion unit 500 converts the image signal RGB_I_DATA into the YUV format to generate the input image signal I_DATA.

The YUV-RGB conversion unit 600 converts a format of the output image signal O_DATA having a YUV format into an RGB format to generate an image signal RGB_O_DATA.

The example embodiment of the noise suppression and/or elimination device 10b shown in FIG. 4 may be used if the image signal input to the noise suppression and/or elimination device 10b has an RGB format.

FIG. 5 is a block diagram illustrating an image capturing apparatus according to example embodiments.

Referring to FIG. 5, an image capturing apparatus 700 includes: an image sensor 710; an analog-digital converter ADC 730; and a noise suppression and/or elimination device 740.

The image sensor 710 detects incident light, and generates an analog signal A_DATA based on the detected incident light. The image sensor 710 may be, for example, a charge coupled device (CCD) image sensor or a complementary metal oxide semiconductor (CMOS) image sensor. Noise elements may be included in the analog signal A_DATA while converting the detected incident light into an electric signal.

The analog-digital converter 730 digitizes the analog signal A_DATA to generate input image data I_DATA.

The noise suppression and/or elimination device 740 suppresses and/or eliminates low frequency noise elements from the input image signal I_DATA to generate an output image signal O_DATA.

In at least some example embodiments, if the input image signal I_DATA is in the YUV format, the noise suppression and/or elimination device 740 may be embodied as the noise elimination device 10a of FIG. 1. In other example embodiments, if the input image signal I_DATA is in the RGB format, then the noise suppression and/or elimination device 740 may be embodied as the noise suppression and/or elimination device 10b of FIG. 4. A structure and operation of the noise suppression and/or elimination device 10a and the noise suppression and/or elimination device 10b are described above with reference to FIGS. 1, 2, 3 and 4. Therefore, a detail description of the noise suppression and/or elimination device 740 will be omitted here.

Still referring to FIG. 5, the image capturing apparatus 700 further includes an automatic gain control circuit AGC 720 coupled between the image sensor 710 and the analog-digital converter 730. The automatic gain control circuit 720 amplifies the analog signal A_DATA to a given, desired or predefined level. Therefore, the image capturing apparatus 700 is able to generate an image signal having relatively high luminance using the automatic gain control circuit 720, even if an image is captured in relatively dark circumstances.

The image capturing apparatus 700 further includes a display device 750 to display the output image signal O_DATA.

As described above, although the analog signal A_DATA generated by the image sensor 710 includes noise elements, the noise suppression and/or elimination device 740 may effectively suppress and/or eliminate low frequency noise elements included in the input image signal I_DATA. Therefore, the image capturing apparatus 700 may provide image data having improved quality.

The image capturing apparatus 700 may be various electronic devices such as a smart phone, a digital camera, a personal computer, a laptop computer, a personal digital assistant, etc.

The foregoing is illustrative of the inventive concepts and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A noise elimination device, comprising:
a low pass filter unit configured to generate a low frequency image signal by separating low frequency elements from an input image signal;
a high frequency separation unit configured to generate a high frequency image signal by separating high frequency elements from the input image signal using the low frequency image signal;
a noise filtering unit configured to generate a first filtered image signal by performing noise elimination on the low frequency image signal in only a first direction, and to generate a second filtered image signal by performing noise elimination on the first filtered image signal in only a second direction; and
a signal synthesis unit configured to generate an output image signal based on the high frequency image signal and the second filtered image signal, wherein
the first direction is one of a horizontal direction and a vertical direction, and
the second direction is another of the horizontal direction and the vertical direction.

2. The noise elimination device of claim 1, wherein the noise filtering unit comprises:
a decimation unit configured to generate a compressed image signal by decimating the low frequency image signal in the horizontal direction;
a horizontal filtering unit configured to generate the first filtered image signal by performing noise elimination on the compressed image signal in the horizontal direction;
a vertical filtering unit configured to generate the second filtered image signal by performing noise elimination on the first filtered image signal in the vertical direction; and
an interpolation unit configured to interpolate the second filtered image signal in the horizontal direction.

3. The noise elimination device of claim 2, wherein the horizontal filtering unit is configured to generate the first filtered image signal by averaging pixel values of adjacent pixels in the horizontal direction.

4. The noise elimination device of claim 2, wherein the vertical filtering unit configured to generate the second filtered image signal by averaging pixel values of adjacent pixels in the vertical direction.

5. The noise elimination device of claim 2, wherein the vertical filtering unit includes an asymmetric infinite impulse response filter.

6. The noise elimination device of claim 2, wherein the noise filtering unit further comprises:
a signal processing unit coupled between the horizontal filtering unit and the vertical filtering unit, the signal processing unit being configured to correct the first filtered image signal based on the compressed image signal, and to provide the corrected first filtered image signal to the vertical filtering unit.

7. The noise elimination device of claim 6, wherein the signal processing unit is configured to correct the first filtered image signal by replacing pixel values representing image elements in the first filtered image signal with pixel values representing image elements in the compressed image signal.

8. The noise elimination device of claim 2, wherein the noise filtering unit further comprises:
a signal processing unit coupled between the vertical filtering unit and the interpolation unit, the signal processing unit being configured to correct the second filtered image signal based on the compressed image signal, and to provide the corrected second filtered image signal to the interpolation unit.

9. The noise elimination device of claim 8, wherein the signal processing unit is configured to correct the second filtered image signal by replacing pixel values representing image elements in the second filtered image signal with pixel values representing image elements in the compressed image signal.

10. The noise elimination device of claim 1, wherein the high frequency separation unit comprises:
a subtracter configured to generate the high frequency image signal by subtracting the low frequency image signal from the input image signal.

11. The noise elimination device of claim 1, wherein the signal synthesis unit comprises:
an adder configured to generate the output image signal by adding the high frequency image signal and the second filtered image signal.

12. The noise elimination device of claim 1, further comprising:
a RGB-YUV conversion unit configured to generate the input image signal by converting a RGB input image signal into a YUV format; and
a YUV-RGB conversion unit configured to generate a RGB output image signal by converting the output image signal into a RGB format.

13. An image capturing apparatus, comprising:
an image sensor configured to generate an analog signal corresponding to detected incident light;
an analog-to-digital converter configured to digitize the analog signal to generate input image signal; and
a noise elimination device configured to eliminate low frequency noise elements from the input image signal to generate an output image signal, the noise elimination device including,
a low pass filter unit configured to generate a low frequency image signal by separating low frequency elements from the input image signal;
a high frequency separation unit configured to generate a high frequency image signal by separating high frequency elements from the input image signal using the low frequency image signal;
a noise filtering unit configured to generate a first filtered image signal by performing noise elimination on the low frequency image signal in only a first direction, and to generate a second filtered image signal by performing noise elimination on the first filtered image signal in only a second direction; and
a signal synthesis unit configured to generate an output image signal based on the high frequency image signal and the second filtered image signal, wherein
the first direction is one of a horizontal direction and a vertical direction, and
the second direction is another of the horizontal direction and the vertical direction.

14. The image capturing apparatus of claim 13, wherein the noise filtering unit comprises:
a decimation unit configured to generate a compressed image signal by decimating the low frequency image signal in the horizontal direction;
a horizontal filtering unit configured to generate the first filtered image signal by performing noise elimination on the compressed image signal in the horizontal direction;
a vertical filtering unit configured to generate the second filtered image signal by performing noise elimination on the first filtered image signal in the vertical direction; and
an interpolation unit configured to interpolate the second filtered image signal in the horizontal direction.

15. The image capturing apparatus of claim 14, wherein the noise filtering unit further comprises:
a first signal processing unit coupled between the horizontal filtering unit and the vertical filtering unit, the first signal processing unit being configured to correct the first filtered image signal based on the compressed image signal, and to provide the corrected first filtered image signal to the vertical filtering unit; and
a second signal processing unit coupled between the vertical filtering unit and the interpolation unit, the second signal processing unit being configured to correct the second filtered image signal based on the compressed image signal, and to provide the corrected second filtered image signal to the interpolation unit.

16. A noise suppression device, comprising:
a low pass filter unit configured to generate a low frequency image signal by separating low frequency elements from an input image signal;
a noise filtering unit configured to generate a first filtered image signal by suppressing noise from the low frequency image signal in only a first direction, and to generate a second filtered image signal by suppressing noise from the first filtered image signal in only a second direction; and
a signal synthesis unit configured to generate an output image signal based on the second filtered image signal, wherein
the first direction is one of a horizontal direction and a vertical direction, and
the second direction is another of the horizontal direction and the vertical direction.

17. The noise suppression device of claim 16, further comprising:
a high frequency separation unit configured to generate a high frequency image signal by separating high frequency elements from the input image signal using the low frequency image signal; wherein
the signal synthesis unit is configured to generate the output image signal by combining the high frequency image signal with the second filtered image signal.

18. The noise suppression device of claim 16, wherein the noise filtering unit comprises:
a decimation unit configured to generate a compressed image signal by decimating the low frequency image signal in the horizontal direction;
a horizontal filtering unit configured to generate the first filtered image signal by suppressing noise from the compressed image signal in the horizontal direction;
a vertical filtering unit configured to generate the second filtered image signal by suppressing noise from the first filtered image signal in the vertical direction; and
an interpolation unit configured to interpolate the second filtered image signal in the horizontal direction.

19. The noise suppression device of claim 18, wherein the horizontal filtering unit is configured to generate the first filtered image signal by averaging pixel values of adjacent pixels in the horizontal direction, and the vertical filtering unit is configured to generate the second filtered image signal by averaging pixel values of adjacent pixels in the vertical direction.

20. The noise suppression device of claim 16, wherein the noise filtering unit is further configured to sequentially suppress noise from the low frequency image signal in the first direction, and then in the second direction.

\* \* \* \* \*